March 20, 1962    W. CRAWFORD    3,025,985
GOLF CART TRAILER
Filed July 25, 1958    2 Sheets-Sheet 1
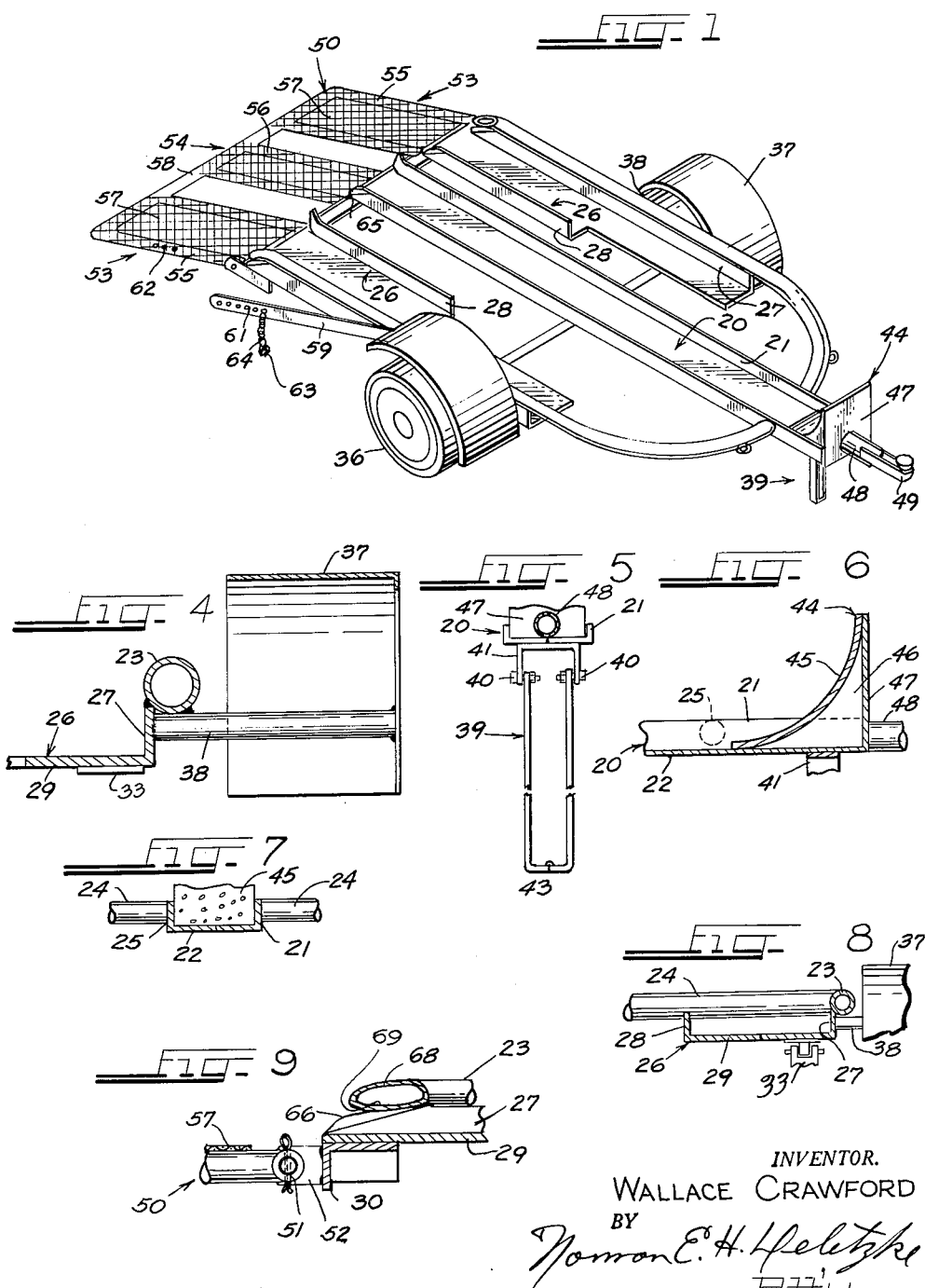
INVENTOR.
WALLACE CRAWFORD
BY
Norman E. H. Heletzke
ATTY.

March 20, 1962 W. CRAWFORD 3,025,985
GOLF CART TRAILER
Filed July 25, 1958 2 Sheets-Sheet 2
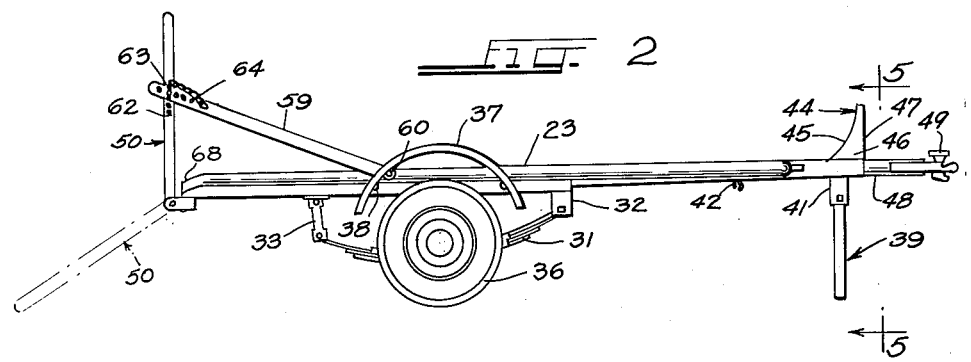
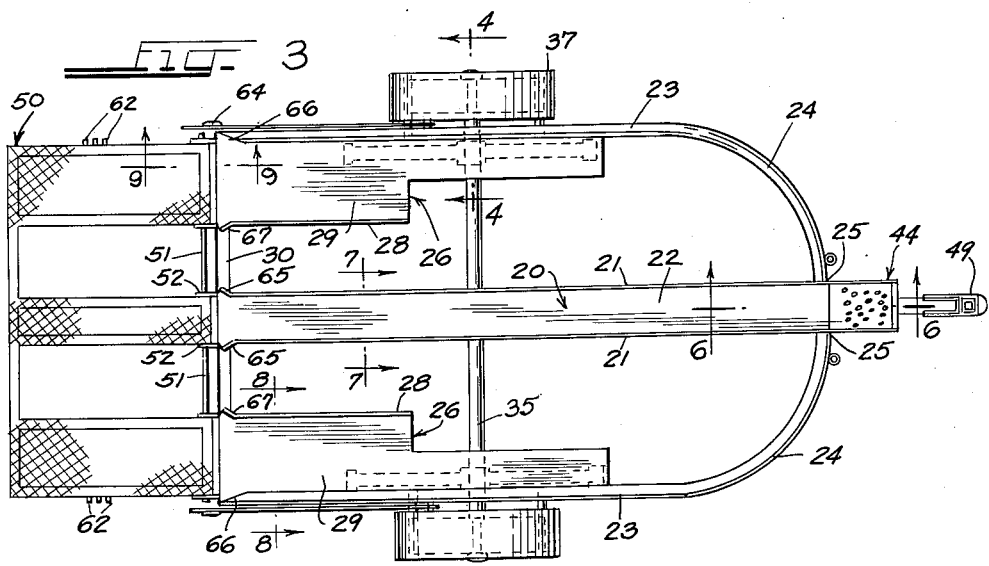
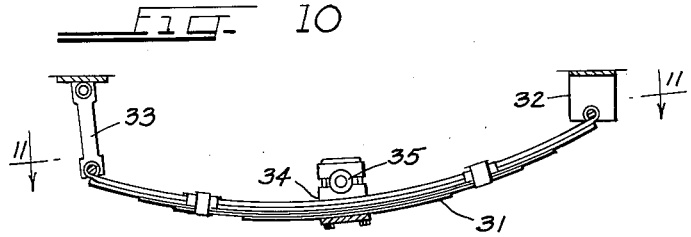
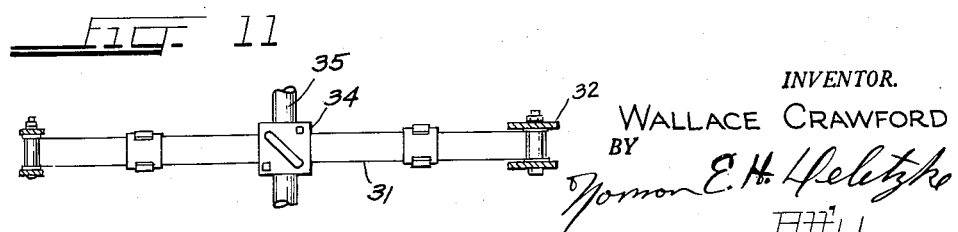
INVENTOR.
WALLACE CRAWFORD
BY

United States Patent Office 3,025,985
Patented Mar. 20, 1962

3,025,985
GOLF CART TRAILER
Wallace Crawford, Old Creek Road, Palos Park, Ill.
Filed July 25, 1958, Ser. No. 750,972
7 Claims. (Cl. 214—505)

This invention pertains to improvements in trailers for carrying wheeled vehicles.

More specifically stated, this invention pertains to structural improvements in trailers particularly well adapted for use in carrying three wheeled vehicles, as for example, the three wheeled type of personnel carriers commonly used on golf courses.

Still more specifically stated, this invention relates to the unique arrangement and formation of the structural members in a "drive-on" and "drive-off" type trailer, whereby the trackways for supporting and guiding the wheels of the vehicle to be carried simultaneously function as structural frame members and bracing members and wheel supporting members.

In commonly known devices of the general type contemplated by this invention it is general practice to provide a special framework for supporting the trackways for the wheels of the vehicle to be carried. In such conventional devices it is also common practice to provide special devices for clamping the wheels of the vehicle being carried to thereby prevent the shifting of the vehicle upon the trailer. It is also common practice in many such devices to provide special winch devices for loading and unloading the vehicles from the trailer.

In the use of trailers for the transporting of vehicles, such as golf carts, it is desirable to utilize a simple structure which may be operated by persons unskilled in the technicalities of trailer loading and unloading, etc. and to provide structure which permits the easy and quick movement, as by driving, of the vehicle onto and off of the trailer with the use of a minimum of effort and skill by the operator of the vehicle. It is also desirable to provide a structure in a trailer wherein the vehicle to be transported, as for example a golf cart, is effectively locked in safe position on the trailer by the use of a minimum number of parts to obtain such temporary locking of the vehicle in position on the trailer.

It is therefore one of the objectives of this invention to provide a trailer for carrying wheeled vehicles, such as golf carts designed for the carrying of personnel, which trailer is of relatively simple yet sturdy construction and which trailer is easily operable, whereby to permit the user of the vehicle to easily and quickly load and/or unload the vehicle from the trailer with a minimum of effort and in a minimum of time while riding in the vehicle.

Another object of this invention is to provide an improved trailer for wheeled vehicles, wherein a minimum number of parts are so constructed and arranged as to utilize various members of the trailer for the multiple purposes of simultaneously functioning as guiding and supporting trackways for the wheels of the vehicle being carried, and to also function as frame and bracing elements of the improved trailer.

A still further object of this invention is to provide an improved trailer of the "drive-on" and "drive-off" type, wherein the vehicle being carried is securely locked in position on the trailer by the use of a single movable element which also functions as a loading and unloading ramp for the trailer and which also functions as a cleaning means for the tires of the vehicle being carried so as to minimize the possibility of slippage of the wheels of the vehicle on the trackways of the trailer while the vehicle is being transported.

Another object of this invention is to provide an improved trailer for wheeled vehicles wherein the trackways of the trailer for supporting the wheels of the vehicles are so constructed and arranged and coact in such a manner with the means provided for locking the vehicle in position on the trailer that vehicles having relatively small variations in the width and length of the wheel base of the vehicles may be readily loaded onto and transported in locked position on the improved trailer.

The reference in this application to the particular usefulness of the invention in a trailer for the handling and transporting of the three wheeled type of golf cart commonly used for carrying personnel on a golf course, and the selection of such a trailer as a basis for the description of the preferred embodiment of the invention, is made for the purpose of example only and is not to be interpreted as a limitation of the invention. Accordingly, the hereinafter contained description of the preferred embodiment of the invention will concern itself primarily with the structure of a trailer for handling and transporting a three wheeled type of personnel carrier commonly referred to as a golf cart.

The present invention in a trailer possesses the advantages of providing an improved trailer of relatively simple and relatively inexpensive yet rigid and effective and efficient structure, and consisting of a minimum number of parts. The improved trailer possesses the further advantage that it may be easily and conveniently used by the operator of the golf cart for quickly loading the golf cart on to and/or unloading the golf cart off of the trailer by driving the golf cart directly onto or off of the trailer. The present invention also possesses the further advantage of utilizing uniquely combined members of the trailer for simultaneously functioning as structural and bracing members and as self guiding and wheel supporting trackways for the wheels of the vehicle being carried on the improved trailer. The fixed wheel stop arrangement for blocking the front wheel of the vehicle being carried and the adjustable rear ramp and end gate combination comprise an effective arrangement for securely locking the vehicle being transported in carrying position on the trailer. The unique structure of the combined loading and unloading ramp and end gate of the trailer also has the further advantage of functioning to remove relatively loose dirt and small stones from the tires of the vehicles while being loaded onto the trailer, thereby assuring a maximum gripping engagement between the trackways of the trailer and the tires of the vehicle to prevent any possible tendency of the vehicle to move while mounted for transportation on the trailer.

The foregoing and other objectives, important novel and useful features and advantages of this invention will become more apparent and be more easily understood upon examination of the following description thereof and the accompanying drawings and appended claims. It should, however, be remembered that, without desire of limitation, the invention will be described and illustrated as the preferred embodiment of the invention in a trailer device or mechanism for the transportation and handling of the three wheeled type of golf cart designed for the carrying of personnel. Certain changes and variations in the invention may suggest themselves to those skilled in the pertinent arts upon review of this application, which changes may not, however, depart from the spirit of this invention and may come within the scope of the appended claims.

In the accompanying drawings:

FIGURE 1 is a perspective view, showing the improved trailer;

FIGURE 2 is a side elevational view of the improved trailer showing the combined loading ramp and end gate structure of the trailer in lowered and raised positions;

FIGURE 3 is a plan view of the improved trailer showing the combined loading ramp and end gate in lowered position;

FIGURE 4 is a transverse vertical sectional view of the fender and frame and trackway assembly with the trailer wheel removed, taken along line 4—4 of FIGURE 3;

FIGURE 5 is a transverse and front elevational view, partially in broken away section of the trailer pedestal and the stop for the front wheel of the vehicle being carried on the trailer, taken along line 5—5 of FIGURE 2;

FIGURE 6 is a vertical sectional view showing a longitudinal section through the stop for the front wheel of the vehicle being carried on the trailer, taken along line 6—6 of FIGURE 3;

FIGURE 7 is a transverse vertical sectional view of the trailer trackway for the front and central wheel of the vehicle being carried, taken along line 7—7 of FIGURE 3;

FIGURE 8 is a transverse vertical sectional view of the rear portion of a trackway for a rear and side wheel of the vehicle being carried, taken along line 8—8 of FIGURE 3;

FIGURE 9 is a transverse vertical sectional view of the juncture of a side trackway or vehicle support element of the trailer, a frame element of the trailer, the rear bracing element of the trailer, and a hinged corner portion of the ramp, taken along line 9—9 of FIGURE 3;

FIGURE 10 is a side elevational view, partially in broken away section of the spring and axle assembly for the improved trailer; and FIGURE 11 is a plan view, partially in broken away section, of the spring assembly included in FIGURE 10.

Referring to the drawings, in which drawings like elements are identified by like numerals, and referring particularly to FIGURES 1, 2 and 3 of the drawings, 20 represents generally a rigid and longitudinally and substantially horizontally extending, elongated, centrally disposed tongue and central vehicle wheel support and trackway member having a channel-chaped vertical transverse cross section with straight upwardly directed and parallel and longitudinally extending side flanges 21, and a flat lower or bottom wall or surface 22 intermediate the lower edges of the flanges 21. Trackway 20 may be formed of a suitably shaped and proportioned channel member or it may be formed by welding together the side edges of two lengths of suitably proportioned angle members. A pair of horizontally disposed and elongated, rigid frame members 23 are uniformly spaced on opposite sides of the central tongue or trackway member 20. The major side portions of frame members 23, which frame members may be formed of lengths of pipe, extend forwardly from the rear portion of member 23 parallel to the centrally disposed wheel support and tongue channel member 20. The forward ends 24 of members 23 are curved inwardly in uniform circular curves so that the forward end of each of the members 23 engages the adjacent side wall 21 of the central member 20 at positions 25, with the upper edge of frame members 23 flush with the upper edges of the side walls or flanges 21 of element 20. The forward extremities or ends of the pipe frame members 23 are rigidly fixed, as by welding, to the outer surfaces of the adjacent flanges 21 and 25.

A pair of rigid, transversely spaced, horizontally disposed, parallel and longitudinally extending vehicle support trackways 26 are uniformly positioned on opposite sides of the rear portion of the central member 20, inwardly of and parallel to the straight portions of the spaced frame members 21. Each of the trackways 26 may be formed of a suitably proportioned length of a channel-shaped member from which the inner half has been cut away for approximately the forward one-third of the length of the trackway 26. Trackways 26 may also be formed by suitably joining, as by welding, abutting edges of suitably proportioned and oppositely faced angle members. Both such angle members thus used to form a trackway 26 have their rear extremities flush and the inner angle member is approximately two-thirds as long as the outer angle member, and the outer angle member is approximately as long as the straight portion of the frame member 23. Parallel and equal height vertical flanges 27 and 28 extend upwardly from the lower wall portion 29 of each of the trackways 26. The inner flange 28 is approximately two-thirds as long as the outer flange 27. The outer flanges 27 are each positioned to abut against the adjacent frame member 23 with the inner surface of each flange 27 flush with and immediately below the inwardly directed surface of the adjacent overlying frame 26, and as thus positioned flanges 27 are rigidly secured, as by welding, to the adjacent frames 23.

A transversely extending straight and horizontally disposed bracing member is aligned with and underlies and is rigidly fixed, as by welding, to the rear extremities of the forwardly and slightly upwardly extending tongue member 20 and the two forwardly extending and horizontal side trackways 26 fixed to the members 23, thereby forming a rigid and substantially horizontal framework of the slightly forwardly and upwardly tilted central trackway 20, the laterally spaced parallel side trackways 26, the frame elements 23, and the bracing member 30.

A pair of spaced and parallel and vertically resilient and longitudinally extending leaf spring members 31 are hingedly connected to the undersides of the outer portions of the trackways 26. Hinge brackets 32, positioned below and fixed to the undersides of the forward portions of the trackways 26 pivotally support the forward ends of the springs 31. Shackles 33 secure the rear extremities of the springs 31 to the undersides of the walls 29 of trackways 26, rearwardly of the brackets 32.

A saddle bracket and bearing block 34 is bolted to the mid-section of each of the springs 31 to properly retain the leaves of the leaf springs 31 in proper relation one to another and to securely engage the transversely and horizontally extending axle element 35 which extends through both bearing block portions of the saddle brackets 34 and underlies approximately the transverse mid-section of the framework comprised of the elements 20, 23, 26 and 30. Transversely spaced ground engaging wheels 36 are rotatably mounted on the opposite ends of axle 35, outwardly of elements 23.

Upwardly curved fenders 37 overlie the wheels 36 and are each supported on two support bars 38 extending outwardly from the adjacent flange 27 and frame 23, to which flange and frame and fender the support bars 38 are secured in any suitable manner, as by welding.

As thus arranged the spaced ground engaging wheels 36, which are positioned at approximately the longitudinal mid-portion of the trailer device, comprise the main support means for the trailer. When the trailer is not hitched to another vehicle for towing, the forward end thereof may rest on a retractable pedestal 39 which is hinged by pins 40 to the hinge plate or hinge element 41 secured, as by welding, to the underside of the front end of the central trackway member 20. Pedestal 39 consists of a generally U-shaped, stiff metal element, hinged at the upper end of the vertical arms thereof to the hinge plate 41. When the pedestal 39 is in trailer-supporting position, the bottom of the U-shaped portion rests on the ground. When the pedestal 39 is not in use, it may be pivoted from the vertical trailer-supporting position to a horizontal position below the central element 20, where it may be retractably locked in such horizontal position by spring clamp 42 secured to the underside of the element 20. Clamp 42 is adapted to compressively engage a clamp engaging projection 43 at the base of the U-shaped pedestal 39.

Stop device 44, for stopping the front central wheel of the vehicle being carried on the trailer, is provided on the front upper extremity of the central trackway member 20. Stop 44 comprises an upwardly concave element 45 having a roughened curved surface complementary to the major curved surface of the front wheel of the golf cart to be carried on the trailer. Element 45 is of a width approximately equal to the width of the lower wall 22 of member 20 between the opposed flanges 21 and is of a height approximately equal to one-half of the height of the front wheel of the golf cart being carried. Vertically disposed and parallel side braces 46 and an end brace 47 extend downwardly from the side edges and upper front end respectively of the stop element 45 down to the lower wall 22 of the front extremity of the tongue element 20, and are welded one to another and to the adjacent edges of element 45 and the member 20.

A horizontally disposed hitching shaft 48 is rigidly fixed to and extends forwardly from the lower end of bracing plate 47 at the forward extremity of tongue or trackway member 20. A suitable trailer hitch element 49 is secured to the forward end of shaft 48, whereby to attach the trailer to a suitable towing vehicle.

A ramp 50 is hinged by horizontal hinge pin 51 to the rear portion of the trailer for pivoting about the horizontal axis of pin 51 which is supported in the horizontally aligned hinge pin openings in the series of hinge brackets 52, secured to the rear bracing member 30 in transversely spaced order. Ramp 50 has three separate and parallel ramp trackways, a pair of outwardly spaced trackways 53 and a central trackway 54. Trackways 53 and 54 are aligned respectively with the rear extremities of the two outwardly spaced trackways 26 and the middle trackway 20. Each of the ramp trackways 53 and 54 is comprised of a substantially rectangular and rigid pipe frame 55 and 56 respectively and is of the desired length and of a width corresponding generally to, but being slightly narrower than, the width of the associated trackways 20 and 26 as the case may be. The end of each of the frames 55 and 56 adjacent the supporting trackways 20 and 26 is open at both transverse extremities of such ends, and such transverse end pipes of those frames are telescoped over the hinge pin 51 intermediate a pair of supporting hinge blocks 52 for each ramp element 53 and 54. A hinge bracket element 52, generally stated, is aligned with each of the several flanges 21, 27 and 28 of the trackways 20 and 26.

The upper wheel engaging surface of each of the ramp trackways 53 and 54 consists of a flat sheet 57 of heavy steel mesh or similar material. Such sheets of mesh material are approximately the size of the respective frames 55 or 56 as the case may be, to which frames the mesh material is secured in any suitable manner, as by welding. In the use of the trailer the mesh ramp trackways tend to clean dirt and gravel from the wheels of the carts loaded onto the trailer, thereby enabling the tires of the carts to more securely grip the trackways of the trailer and thereby stabilize the carts being transported.

In lowered position the ramp 50 provides a convenient means of access to the vehicle storage position of the improved trailer. When the ramp 50 is pivoted to a substantially vertical position, it also functions as an effective and adjustable end gate to lock the carried vehicle between the front wheel stop 44 and the combined end gate, ramp and wheel cleaner 50. The ramp trackways 53 and 54 as defined by the pipe frames 55 and 56 are rigidly tied together at their rear extremities by a continuous pipe member 58.

Two transversely spaced stay bars 59, pivoted at their front ends on bolts 60, fixed to the outer surface of frame elements 23, are provided at their rear extremities with a series of longitudinally spaced openings 61 for selectively receiving a selected one of a group of outwardly extending stud bolts 62 fixed in vertical spaced relation to the outer edges of frames 55. Stay bars 59 are provided to releasably lock the end gate 50 in adjusted vertical position. Spring clips 63, secured by chains 64 to stay bars 59 are inserted through holes in the ends of bolts 62 to lock the stay bars 59 to the selected bolts 62. By selecting the appropriate bolt 62 and one of the bolt openings 61 in the end of the stay bars 59, the ramp or gate 50 may be locked in vertical or in slightly tilted position. When the stay bars 59 are not in use they may be pivoted on their pivot pins 60 until they are supportingly engaged by the underlying fender brace arm 38.

As will be noted upon inspection of FIGURE 3, each of the top corners 65 of the rear extremities of the flanges 21 and the corresponding top rear corners 66 and 67 of the flanges 27 and 28 respectively, is bent outwardly from the associated trackways of which it forms a part, whereby to prevent cutting the tires of the wheels of vehicles being loaded onto the trailer. To accommodate the outerward bending of the corners 66 of the outer flanges 27, the inner portion of the rear extremity of the adjacent frame element 23 has been removed to provide such ends of those frame members with an outwardly beveled surface. The outwardly beveled ends 68 of the pipe frames 23 have been bent down slightly so that the lower beveled edge 69 of the end 68 of the pipe frames 23 may be welded to the upper edge of the outwardly bent and adjacent rear corner 66 of the flange 27.

From the foregoing description of this invention and from the accompanying drawings, it will be apparent that this invention realizes the introductorily enumerated objectives respecting the improvements in a trailer device for carrying vehicles, such as golf carts and the like. It will similarly be apparent that the invention also possesses the hereinbefore listed advantages and provides a new, novel and useful trailer device.

Having thus described and illustrated the preferred embodiment of this invention in an improved trailer for golf carts and the like, the invention is not to be interpreted as being restricted to the specifically illustrated and described embodiment of the invention as set forth in the drawings and as hereinbefore described, except insofar as is necessitated by the appended claims and the disclosures of the prior art.

The invention is hereby claimed as follows:

1. A trailer device for transporting a wheeled vehicle, comprising, in combination, an elongated and longitudinally extending and centrally disposed trackway and tongue means for receiving the tension of a towing device, hitch means usable for securing the forward end of said trackway and tongue means to a towing device, a horizontally and transversely extending rear cross bar means permanently and rigidly fixed at its mid-portion to the underside of the rear extremity of said trackway and tongue means, two opposed and horizontally disposed and longitudinally extending side frame means having circular cross sections and disposed at their rear portions parallel to and uniformly spaced from opposite sides of said trackway and tongue means and having the underside of their rear extremities uniformly spaced above the plane of said cross bar means and extending rearwardly substantially as far as the rear extremity of said trackway and tongue means, said frame means having their forward portions uniformly curved inwardly toward said trackway and tongue means and having their front extremities permanently and rigidly fixed respectively to opposite sides of the forward portions of said trackway and tongue means, two opposed and horizontally disposed and longitudinally extending rigid trackway and support means uniformly spaced from each side of said trackway and tongue means intermediate said trackway and tongue means and said side frame means and parallel to said trackway and tongue means and parallel to adjacent side frame means, said trackway and support means being permanently and rigidly fixed respectively throughout their entire lengths to the lower portions of and underlying the adjacent side frame means between the rear extremities of said side frame means and the inwardly curved front portions of said side frame means to form thereby a vertical load reinforcement for said side frame means, said trackway and support means having their rear extremities aligned with the rear extremity of said trackway and tongue means and overlying and permanently and rigidly fixed to said rear cross bar means, ramp trackway means pivoted to said rear cross bar means and adapted to be pivoted from a substantially vertical position to a downwardly and rearwardly inclined position, and a ground engaging wheel assembly disposed below said trackway and support means, said ground engaging wheel assembly including rigid axle means extending transversely of said trackway and support means and a pair of transversely spaced wheels rotatably journaled on the outer ends of said axle means, and spring means rigidly fixed to said axle means and hingedly fixed to said trackway and support means.

2. A semi-trailer type vehicle cooperative to be drawn by a towing device, comprising, in combination, two spaced and longitudinally extending and horizontally disposed frame elements having circular cross sections and lying in a single plane and having straight rear portions and inwardly and uniformly curved forward ends directed toward one another and spaced directly opposite one another to form substantially a U-shaped configuration of the frame elements, an elongated and longitudinally extending central wheel support element for receiving the tension of a towing device and positioned midway between said frame elements and extending forwardly beyond said frame elements and having its forward end pitched slightly upwardly at an angle to the plane of said frame elements and permanently and rigidly secured at its forward portion to the forward ends of said frame elements, a towing hitch assembly operatively connected to the forward end of said central wheel support element and cooperable to releasably engage a towing device whereby the semi-trailer may be towed, a pair of longitudinally extending side wheel support elements parallel to said central wheel support element with said central wheel support element positioned midway between said side wheel support elements, said side wheel support elements each being parallel to and permanently and rigidly fixed throughout their entire lengths to and underlying the rear and straight portion of an adjacent one of said frame elements to form a vertical load reinforcement for said frame elements, and transversely extending brace element means permanently and rigidly secured to the trailing end of said central wheel support element and to the trailing end of each of said side wheel support elements, ramp trackway means pivoted to said brace element means and adapted to be pivoted from a substantially vertical position to a downwardly and rearwardly inclined position, a ground engaging wheel assembly disposed below said side wheel support elements, said ground engaging wheel assembly including a rigid axle means extending transversely of said side wheel support elements and a pair of spaced wheels rotatably journaled on the outer ends of said axle means, and spring means rigidly fixed to said axle means and hingedly fixed to said side wheel support elements.

3. In combination, transversely spaced and longitudinally extending and elongated frame means having rear and forward extremities and having a circular cross section, elongated and parallel and longitudinally extending outer trackways transversely spaced intermediate said frame means, elongated and longitudinally extending central trackway and tongue means centrally positioned intermediate and parallel to said outer trackways and adapted at its forward end to receive the pull of a towing device, said outer trackways and said central trackway and tongue means each having upwardly directed parallel side flanges and the outer side flanges of said outer trackways each being permanently and rigidly fixed to and underlying adjacent portions of said frame means along the entire length of the respective outer side flanges of said outer trackways, said outer trackways also being permanently and rigidly fixed at their forward extremities by said frame means to said central trackway and tongue means to which said frame means is also permanently and rigidly fixed, rigid bracing means permanently and rigidly secured to the aligned rear extremities of said outer trackways and said central trackway and tongue means, ramp trackway means pivoted to said brace element means and adapted to be pivoted from a substantially vertical position to a downwardly and rearwardly inclined position, hitch means at the forward extremity of said central trackway and tongue means, and transversely spaced road engageable wheels operatively journaled to axle means secured to spring means operatively connected to said outer trackways.

4. A device according to claim 3, wherein said ramp trackway means is provided with openwork trackways for vehicle wheels, and ramp stay bar means pivoted at one end to said frame means and adjustably engageable at the opposite end with lock means carried by said ramp trackway means.

5. A device according to claim 3, wherein said outer trackways and said central trackway and tongue means are each provided with upstanding flanges to function as wheel guides and to also function as vertical load reinforcing structural elements, the rear extremity of each of said upstanding flanges being bent outwardly from the associated trackway to provide easy access of a wheel of a vehicle into the respective trackway.

6. A device according to claim 3, wherein the frame means comprises round pipe means fixed to and disposed along the upper edge of and overlying the outer upstanding side flange of each of the outer trackways, each of the outer upstanding side flanges fixed to said round pipe means being disposed perpendicular to the plane of the lower portion of the outer trackway of which it forms an integral part, whereby said outer upstanding side flanges function as guides for vehicle wheels traversing said trackways and also function as structural reinforcing means for said outer trackways and the portion of said frame means secured thereto, said rounded pipe means also functioning as a guard to protect the wheels of vehicles traversing said outer trackways from cutting engagement with the upper edges of said outer upstanding flanges.

7. A device according to claim 3, provided with stay bar means pivoted to said frame means for adjustably engaging said ramp trackway means and selectively and rigidly and releasably locking said ramp trackway means in desired vertical or approximately vertical position, said approximately vertical position being located selectively on either side of said vertical position, whereby said ramp trackway means also functions as an end gate means for the improved device and whereby the distance between a wheel stop device fixed to the forward end of said central trackway and tongue means and the ramp trackway means when the ramp trackway means is in position to be engaged by said stay bar means may be selectively varied by the adjustment of said stay bar means from a distance greater than the distance between said stop device and said ramp trackway means when vertically disposed to a distance less than the distance between said stop device and said ramp trackway means when vertically disposed.

References Cited in the file of this patent
UNITED STATES PATENTS

| | | |
|---|---|---|
| 1,538,052 | Mueller | May 19, 1925 |
| 2,561,081 | Vars | July 17, 1951 |
| 2,628,733 | Hale | Feb. 17, 1953 |
| 2,650,730 | Rohm | Sept. 1, 1953 |
| 2,661,108 | Horn et al. | Dec. 1, 1953 |
| 2,750,226 | Ash | June 12, 1956 |
| 2,784,857 | Duffy | Mar. 12, 1957 |
| 2,797,960 | Endres et al. | July 2, 1957 |
| 2,812,081 | Schrader | Nov. 5, 1957 |
| 2,849,130 | Van der Velde | Aug. 26, 1958 |
| 2,860,800 | Wilson et al. | Nov. 18, 1958 |